(12) United States Patent
Foucher et al.

(10) Patent No.: US 8,936,214 B2
(45) Date of Patent: Jan. 20, 2015

(54) PASSENGER SEATING ARRANGEMENTS

(75) Inventors: Benjamin Foucher, Bourges (FR); Philippe Roy, Bourges (FR)

(73) Assignee: Zodiac Seats France, Issoudun (FR)

(\*) Notice: Subject to any disclaimer, the term of this patent is extended or adjusted under 35 U.S.C. 154(b) by 370 days.

(21) Appl. No.: 13/446,127

(22) Filed: Apr. 13, 2012

(65) Prior Publication Data

US 2013/0032668 A1    Feb. 7, 2013

Related U.S. Application Data

(60) Provisional application No. 61/475,847, filed on Apr. 15, 2011.

(51) Int. Cl.
*B64D 11/06* (2006.01)
*B60N 2/01* (2006.01)
*B60N 2/24* (2006.01)
*B60N 2/34* (2006.01)
*B60N 2/005* (2006.01)

(52) U.S. Cl.
CPC ...... *B64D 11/06* (2013.01); *B60N 2/01* (2013.01); *B60N 2/242* (2013.01); *B60N 2/34* (2013.01); *B60N 2/005* (2013.01); *B64D 2011/0617* (2013.01); *B64D 2011/0658* (2013.01)
USPC .......... 244/118.6; 244/122 R; 297/65; 297/63

(58) Field of Classification Search
USPC ................. 244/118.6, 122 R; 297/65, 63
See application file for complete search history.

(56) References Cited

U.S. PATENT DOCUMENTS

| | | | | |
|---|---|---|---|---|
| 4,735,456 | A | * | 4/1988 | Haefelfinger .................. 297/62 |
| 5,425,516 | A | * | 6/1995 | Daines ...................... 244/118.6 |
| 5,740,989 | A | * | 4/1998 | Daines ...................... 244/118.6 |
| 6,715,716 | B1 | * | 4/2004 | Cheung ..................... 244/118.6 |
| 7,156,346 | B2 | | 1/2007 | Mercier |

(Continued)

FOREIGN PATENT DOCUMENTS

| | | |
|---|---|---|
| FR | 2902742 A1 | 12/2007 |
| GB | 907472 A | 10/1962 |

(Continued)

OTHER PUBLICATIONS

International Search Report and Written Opinion dated Sep. 27, 2012 in Application No. PCT/IB2012/000871.

(Continued)

*Primary Examiner* — Christopher P Ellis
(74) *Attorney, Agent, or Firm* — Kilpatrick Townsend & Stockton LLP; Dean W. Russell, Esq.; Tiffany L. Williams, Esq.

(57) ABSTRACT

Passenger seating arrangements are detailed. At least some arrangements permit each passenger to access an aisle of a vessel without contacting an adjacent passenger. Movable footwells may be utilized to floor-level access when retracted and function as steps when extended as a seat is converted to a bed. This structure authorizes decrease in seat pitch without decrease of bed length, permitting additional seating to be included in a cabin of a vessel without diminishment of passenger comfort.

16 Claims, 5 Drawing Sheets

(56) References Cited

U.S. PATENT DOCUMENTS

| | | |
|---|---|---|
| 7,578,470 B2 | 8/2009 | Plant |
| 7,918,504 B2 * | 4/2011 | Thompson ................ 297/248 |
| 7,975,962 B2 * | 7/2011 | Jacob ...................... 244/118.6 |
| 8,011,723 B2 * | 9/2011 | Park et al. ................ 297/118 |
| 8,118,365 B2 * | 2/2012 | Henshaw .................. 297/245 |
| 2004/0051003 A1 | 3/2004 | Cheung |
| 2011/0253838 A1 * | 10/2011 | Bettell ..................... 244/118.6 |
| 2011/0309662 A1 * | 12/2011 | Veneruso .................. 297/232 |
| 2012/0298798 A1 * | 11/2012 | Henshaw et al. ......... 244/118.6 |

FOREIGN PATENT DOCUMENTS

| | | |
|---|---|---|
| GB | 2452168 A | 2/2010 |
| WO | 2008122761 A1 | 10/2008 |
| WO | 2012140515 | 10/2012 |

OTHER PUBLICATIONS

International Preliminary Report on Patentability dated Oct. 24, 2013 in Application No. PCT/IB2012/000871.

* cited by examiner

PASSENGER SEATING ARRANGEMENTS

CROSS-REFERENCE TO RELATED APPLICATION

This application claims the benefit of and priority to U.S. Provisional Patent Application Ser. No. 61/475,847, filed Apr. 15, 2011, the entire contents of which are hereby incorporated by this reference.

FIELD OF THE INVENTION

This invention relates to seating arrangements for passengers and more particularly, although not necessarily exclusively, to arrangements for seating passengers within transport vessels such as aircraft in which seats for the passengers are convertible into beds.

BACKGROUND OF THE INVENTION

U.S. Pat. No. 7,156,346 to Mercier details exemplary passenger seating arrangements. The seating arrangements may comprise "a plurality of seats which can be converted into beds and disposed in rows, each row extending in the longitudinal direction of the aircraft, and each seat being oriented towards the front of the aircraft." See Mercier, col. 1, ll. 554-57. Seat groups adjacent a wall of an aircraft include transverse passages allowing occupants of seats immediately adjacent the wall to access gangways or aisles of the aircraft. By including these transverse passages, the arrangements avoid any requirement of a passenger to "step[ ] over the adjacent passenger in order to reach the gangway when the seat of the other passenger is placed in the bed position." See id., col. 2, ll. 9-11. The transverse passages otherwise represent unused space, however, reducing passenger density within the aircraft cabin.

U.S. Pat. No. 7,578,470 to Plant illustrates other passenger seating arrangements within aircraft. Rather than being oriented longitudinally within an aircraft, seats of the Plant patent are angled with respect to the longitudinal axis of the aircraft. Moreover, pairs of seats are disposed at opposed angles "to form essentially a 'V' shape," with the distance between feet of adjacent passengers being less than the distance between their heads. An immovable center unit forward of the pair of seats provides footwells for both passengers when their respective seats are converted into beds. Hence, an occupant of a seat closest a wall of an aircraft must risk contacting the body of a sleeping adjacent passenger in order to access an aisle.

U.S. Pat. No. 7,918,504 to Thompson discloses yet other passenger seating arrangement for use on-board aircraft. Adjacent seats overlap both transversely and, at least when converted into beds, longitudinally, with a footwell of one passenger being "located beside the seat of a second" passenger. See Thompson, col. 1, l. 41. The footwells are fixed in position, however, and "occupiers within the central position of a three-seat row (or inner positions of longer rows) need disturb" other passengers when accessing aisles of an aircraft. See id., col. 2, ll. 12-14. The contents of the Mercier, Plant, and Thompson patents are incorporated herein in their entireties by this reference.

SUMMARY OF THE INVENTION

The present invention provides alternatives to the seating arrangements of these existing patents. Unlike conventional seating arrangements, those of the present invention permit each passenger to access an aisle of a vessel without contacting an adjacent passenger. They thus reduce the likelihood that a sleeping passenger will be disturbed by movement of an adjacent passenger to and from his or her seat.

Additionally, equipment and arrangements of the present invention may utilize moveable, rather than fixed-position, footwells. Exteriors of the footwells may function as steps when the footwells are extended into an egress region for a nearby passenger. By contrast, when a footwell is retracted, the egress region is vacant and available for floor-level passage, similar to the transverse passages of the Mercier patent. In either circumstance—by using the egress region directly or by using the step—a passenger may pass to and from an aisle of an aircraft without disturbing a neighboring passenger. No longer, therefore, is the egress region directly dedicated to passenger egress, as at times the region may accommodate both a footwell and passenger egress (and ingress). This approach of the present invention consequently allows decrease in seat pitch without diminishment of bed length, permitting additional seating to be included in a cabin over at least the layouts of the Mercier patent, for example, without sacrificing passenger comfort.

Presently-preferred versions of the invention for use in passenger aircraft comprise pluralities of seats facing generally forward (i.e. in the predominant direction of flight of the aircraft). They hence are oriented generally longitudinally within an aircraft cabin, generally either along or parallel to the longitudinal axis of the cabin. Some or all seats nevertheless may, if desired, form a non-zero angle with respect to either the longitudinal cabin axis or any axis parallel thereto. Moreover, at least some adjacent seats may be staggered, so that they are not aligned transversely within the cabin. Also desirably included are means for attaching the seats directly or indirectly to cabin floors, which attaching means may be conventional.

It thus is an optional, non-exclusive object of the present invention to provide passenger seating arrangements.

It is also an optional, non-exclusive object of the present invention to provide seating equipment with moveable footwells.

It is another optional, non-exclusive object of the present invention to provide stepped passages for certain passengers to use when moving to or from their seats in order to reduce risk the movement disturbing certain other passengers.

It is an additional optional, non-exclusive object of the present invention to provide seating arrangements permitting each passenger to access an aisle of a vessel without substantial risk of contacting an adjacent passenger.

It is a further optional, non-exclusive object of the present invention to provide seating arrangements in which transverse passages, or egress regions, may also accommodate footwells of nearby passengers.

It is, moreover, an optional, non-exclusive object of the present invention to provide seating arrangements in which seats face generally forward and are oriented generally longitudinally within an aircraft cabin.

It is yet another optional, non-exclusive object of the present invention to provide seating arrangements in which at least some seats are not aligned transversely within the cabin.

Other objects, features, and advantages of the present invention will be apparent to those skilled in the appropriate art with reference to the remaining text and the drawings of this application.

DETAILED DESCRIPTION

Figure 1:
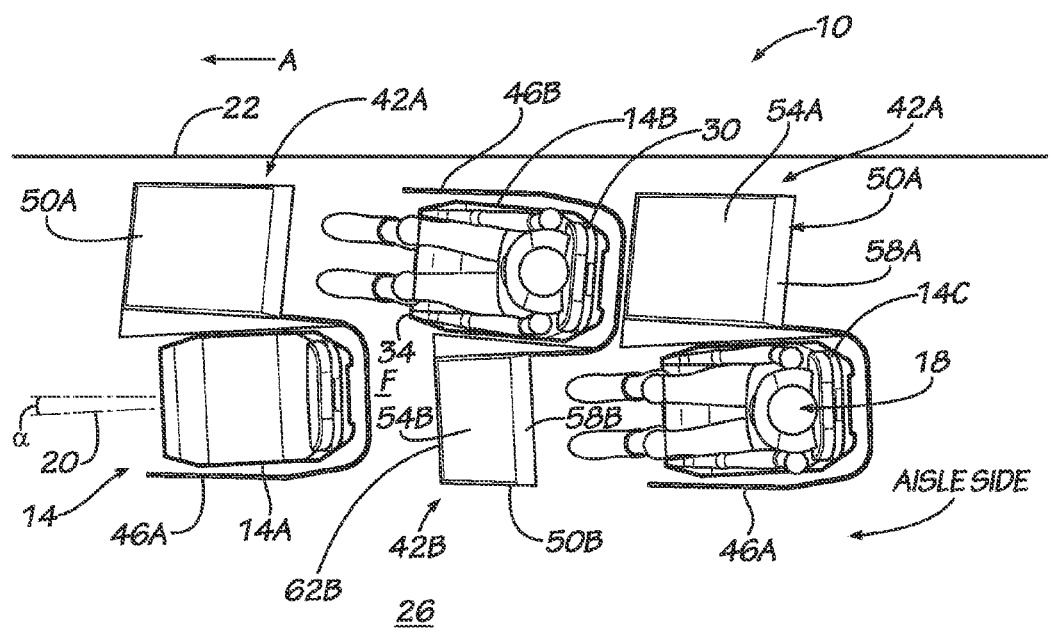
FIG. 1 is a top, partially-schematicized view of part of an exemplary column of seats arranged consistent with the present invention, with occupied seats shown in a generally upright condition.

Illustrated in FIGS. 1-9 is an exemplary arrangement 10 of seats 14 primarily for use in a passenger aircraft or other transit vessel. Arrangement 10 may comprise at least seats 14A-C as depicted in FIGS. 1-9. Alternatively, arrangement 10 may comprise fewer or greater numbers of seats 14 than depicted. Indeed, for commercial purposes within passenger aircraft, for example, arrangement 10 typically will comprise substantially more than three seats 14.

Nevertheless, as illustrated each of seats 14A-C faces generally in the direction of arrow A. This direction preferably is the predominant direction of movement of the vessel (although it need not necessarily be so). Consequently, an occupant 18 of each seat 14A-C preferably faces forward, toward the front of the vessel and in its predominant direction of movement, when his or her corresponding seat 14A-C is upright.

Arrangement 10 may be considered as a column of seats 14 extending longitudinally within a vessel. The column may extend along a longitudinal axis of the vessel or along any axis generally parallel to the longitudinal axis. Seats 14 within the column themselves may extend along any such axis; alternatively, as shown especially in FIGS. 1-2 and 4, each seat 14A-C may define a longitudinal seat axis 20 at an angle±α from any such axis. Angle α preferably ranges from 0-20° in absolute magnitude, and more preferably ranges from 5-10° in absolute magnitude, although it is not necessarily limited to these ranges.

Preferably, arrangement 10 forms a column of seats 14 adjacent the vessel fuselage or cabin wall 22, positioned between wall 22 and a longitudinally-extending gangway or aisle 26. If desired, a mirror image of arrangement 10 may be placed adjacent the cabin wall opposite wall 22, forming another column of seats 14 positioned between that wall and either aisle 26 or a second aisle (not shown). Depending on the width of the vessel, additional columns of seats may be positioned in the central longitudinal region of the cabin.

Adjacent seats 14B and 14C (or 14A and 14B) beneficially may be staggered (i.e. unaligned laterally) within the column of arrangement 10. Each seat 14A-C is designed to be convertible into a bed (see FIGS. 3-4 and 7-9) should its occupant 18 desire to sleep or rest in a generally-horizontal position. Each seat 14A-C hence preferably includes at least seat back 30, seat pan or bottom 34, and leg support 38, some or all of which are moveable through a range of positions. In a first, "upright" position, for example, seat back 30 is predominantly vertically oriented and leg support 38 is retracted or otherwise not extended longitudinally. In a second, "bed" position, by contrast, seat back 30 is predominantly horizontally oriented and leg support 38 is longitudinally extended. Movement of components of seats 14A-C may occur mechanically, electromechanically, or through any other suitable mechanism.

Also illustrated in FIGS. 1-9 are auxiliary units 42A-B. Each auxiliary unit 42A-B may, if desired, include privacy shell 46A-B and footwell assembly 50A-B. Unit 42A may include shell 46A and footwell assembly 50A and be referred to as a "left-hand" unit, as shell 46A is to the left of footwell assembly 50A from the standpoint of an occupant 18 oriented as in FIGS. 1-9. By contrast, unit 42B may be denoted as "right-hand" unit, as shell 46B is to the right of footwell assembly 50B from the standpoint of an occupant 18 of the corresponding seat 14. Each shell 46A-B may surround at least a portion of a seat 14 so as to restrict observation of the occupant 18 of the seat 14 and thereby provide some privacy to him or her. Each shell 46A-B additionally preferably is either directly or indirectly attached, connected, adhered, or integrally formed with a footwell assembly 50A-B, although this is not absolutely necessary.

Footwell assemblies 50A-B are designed to receive feet of occupants 18 when corresponding seats 14 of the occupants 18 are converted into beds and the occupants 18 are prone. Although footwell assembly 50B of FIG. 1 is shown as connected to shell 46B partially surrounding seat 14B, it will receive feet of the occupant 18 seated in seat 14C when seat 14C is converted into a bed. Stated differently, a footwell assembly is configured to receive feet of the occupant of the seat immediately therebehind. Accordingly, a seating unit for an occupant 18 will comprise his or her seat and the footwell assembly immediately forward of the seat.

In at least one embodiment of the invention, footwell assemblies 50A-B are box-like structures open toward the feet of occupants 18 seated therebehind Other structures are feasible, however, and may be used instead. Footwell assemblies 50A-B may have generally horizontal upper surfaces 54A-B if desired, thereby functioning as a table or work space, for example. Likewise if desired, footwell assemblies 50A-B may comprise generally vertical sections 58A-B extending above surface 54A-B and possibly including video monitors or other passenger conveniences. In versions shown in FIGS. 1-9, footwell assemblies 50A and 50B are of approximately equal width, although this too is not necessary.

Beneficially unequal, however, are the default lengths of footwell assemblies 50A versus those of footwell assemblies 50B. These differing lengths are well illustrated in FIGS. 1-2 and 5-6, for example. In particular, each footwell assembly 50A may be of a first ("full") default length $L_1$, whereas each footwell assembly 50B preferably is of a second default length $L_2$ less than the full length $L_1$ by an amount $L_3$. Stated differently:

$$L_2 + L_3 = L_1$$

Figure 2:
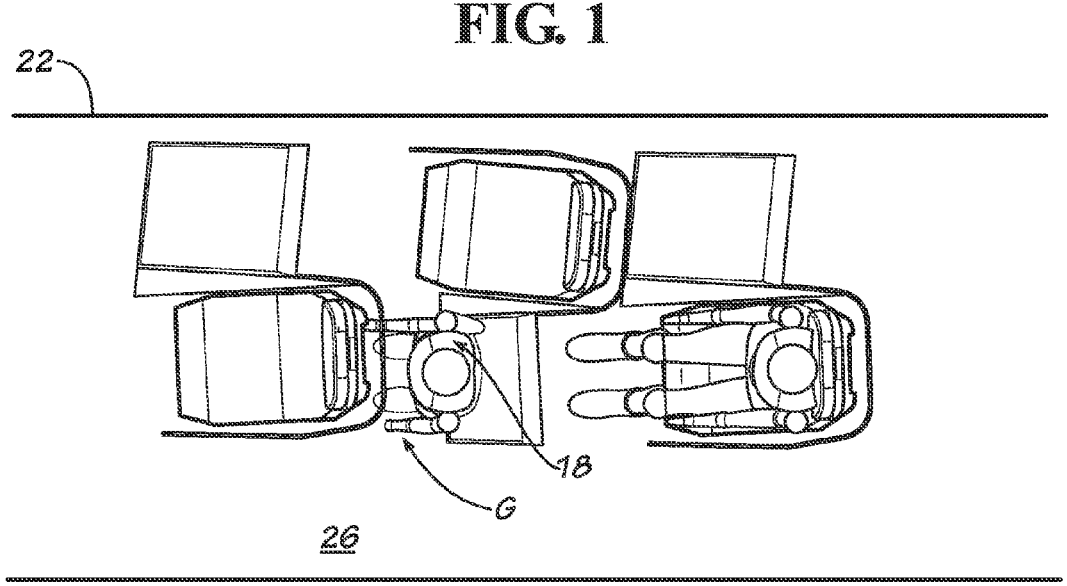
FIG. 2 is a top, partially-schematicized view of the seats of FIG. 1.
Figure 3:
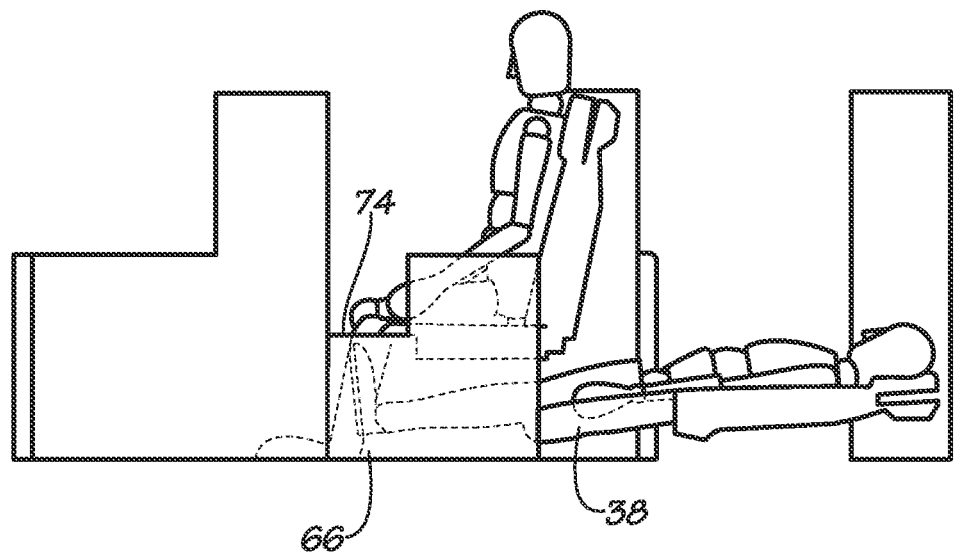
FIG. 3 is an elevational, partially-schematicized view of the seats of FIG. 1, with one occupied seat shown in a generally upright condition and another occupied seat shown converted into a bed.
Figure 4:
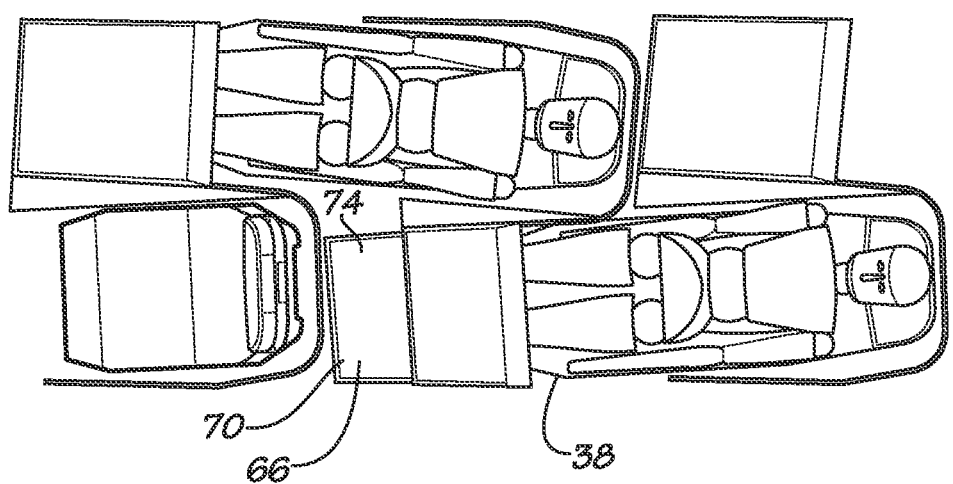
FIG. 4 is an elevational, partially-schematicized view of the seats of FIG. 1, with occupied seats shown converted into beds.
Figure 5:
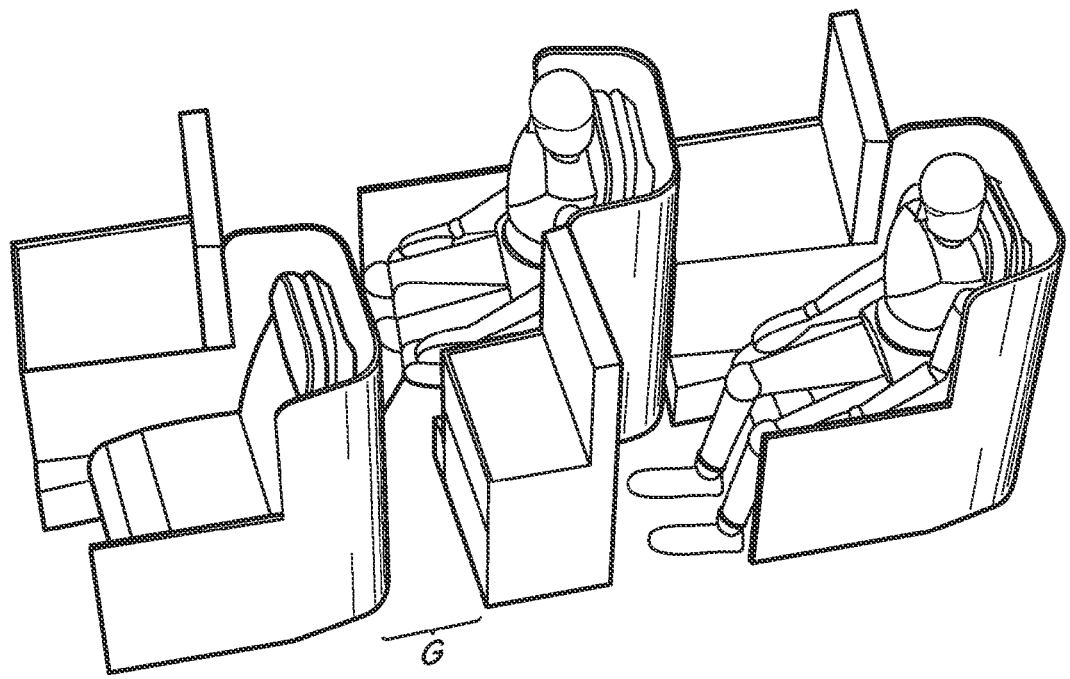
FIG. 5 is a perspective, partially-schematized view similar to that of FIG. 1.
Figure 6:
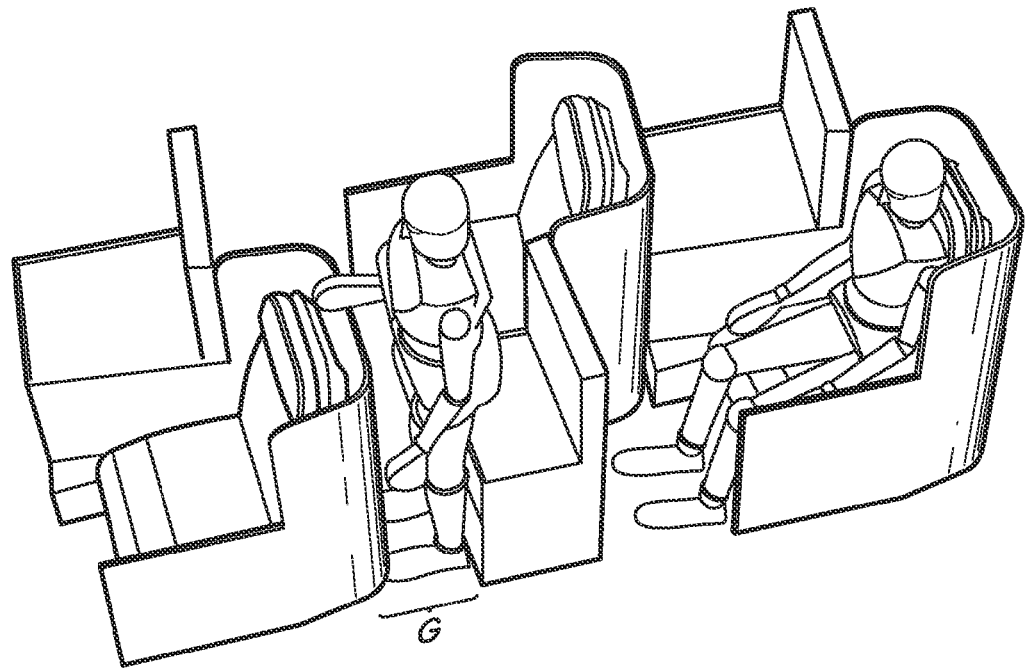
FIG. 6 is a perspective, partially-schematized view similar to that of FIG. 2.
Figure 7:
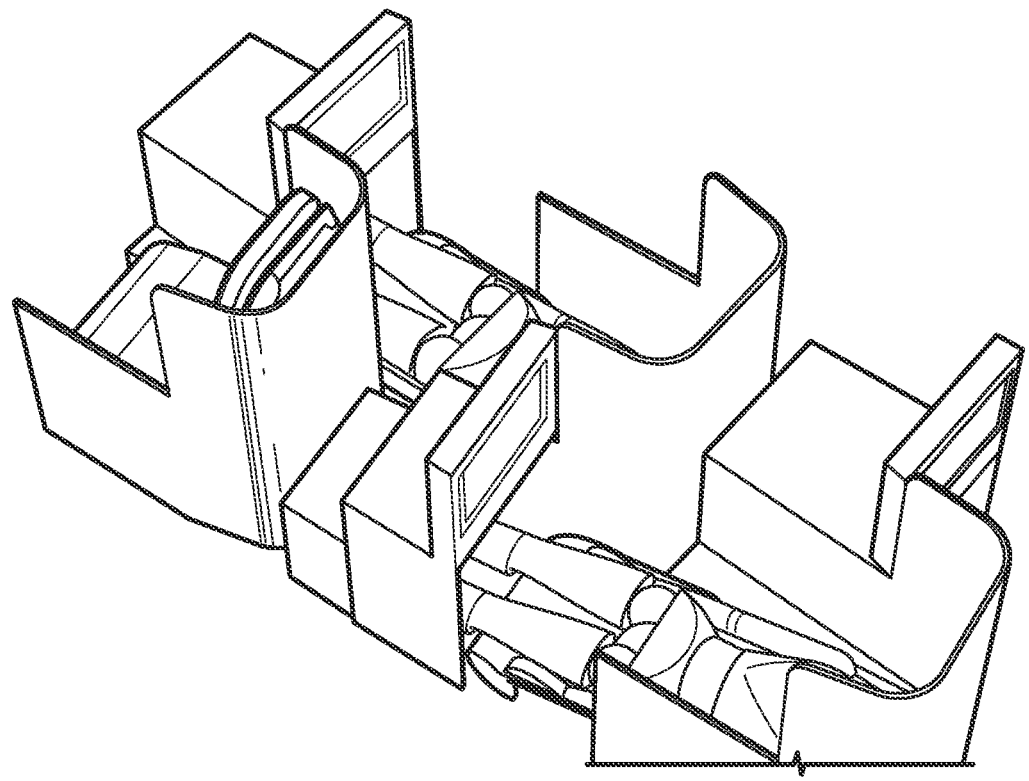
FIG. 7 is a perspective, partially-schematized view similar to that of FIG. 4.

Because each footwell assembly 50B has shorter default length, gap G exists between forward end 62B of each footwell assembly 50B and the shell 46A immediately forward of the footwell assembly 50B. Gap G may have length at least equal to $L_3$ (and preferably will be at least slightly larger than $L_3$) and beneficially extends from floor F of the vessel to a height at least that of most humans. Accordingly, gap G provides an area through which an occupant 18 of any seat 14B may access aisle 26 while standing, as shown in FIGS. 2 and 6.

The length of a bed ("$L_{Bbed}$") into which seat 14B may be converted is approximately equal to the sum of the lengths of its seat back 30 ("$L_{30}$"), its seat bottom 34 ("$L_{34}$"), its leg support 38 ("$L_{38}$"), and the footwell assembly 50A ($L_1$) immediately forward thereof. Written mathematically:

$$L_{Bbed} \approx L_{30}+L_{34}+L_{38}+L_1$$

By contrast, if the default length $L_2$ were the maximum length of footwell assembly 50B, the hypothetical length of the bed ("$L_{CHypobed}$") into which seat 14C would be converted would be approximately only:

$$L_{CHypobed} \approx L_{30}+L_{34}+L_{38}+L_2$$

Accordingly, the occupant 18 of seat 14C would have a shorter bed than would the occupant of seat 14B.

Because creating beds of differing lengths is an undesired result (especially for nearby seats within the same cabin of service), the present invention allows bed lengths to be equalized for all seats 14. This may be achieved by creating extension 66 within each footwell assembly 50B. Extension 66 advantageously may constitute a telescoping, box-like segment retractable so that its forward surface 70 is flush (or approximately so) with forward end 62B. When extended, extension 66 preferably protrudes beyond forward end 62B by a distance approximately equal to $L_3$. An actual length of a bed ("$L_{Cbed}$") into which seat 14C may be converted thus is:

$$L_{Cbed} \approx L_{30}+L_{34}+L_{38}+L_2+L_3$$

which is the same length as $L_{Bbed}$.

Extension 66 may be controlled by an electric actuator, a mechanical linkage, or in any other appropriate manner so as to retract or extend, as appropriate, depending on whether the associated seat 14 is in the "upright" or "bed" position. Extension 66 may extend from floor F and have height sufficient to receive and accommodate most human feet, as shown especially in FIG. 3. The extension 66 beneficially may include an internal shelf or platform above floor F. If such an internal shelf or platform is present, heels of accommodated feet may be raised above floor F an amount approximately equal to (or slightly less than) the amount the remainder of the body of the occupant is raised above floor F.

Figure 8:
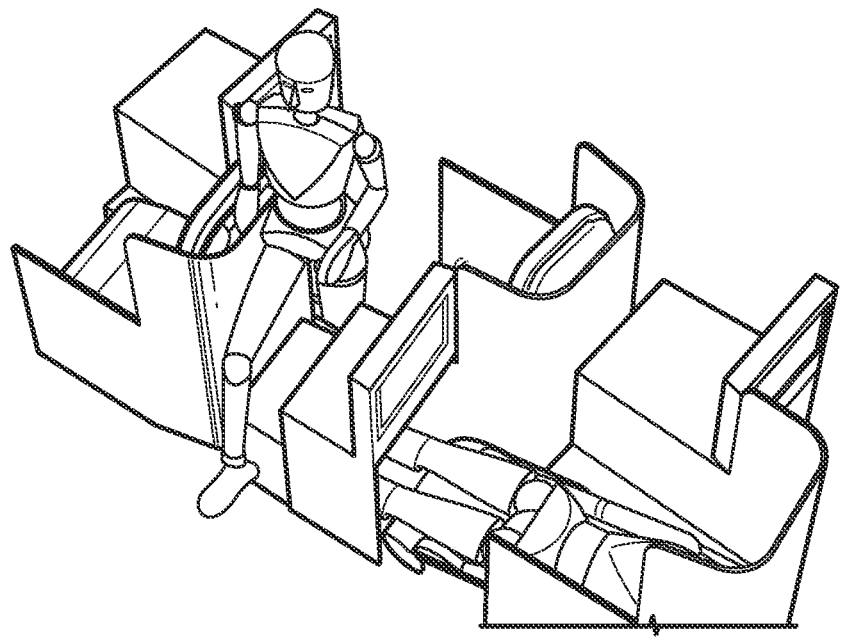
FIG. 8 is a perspective, partially-schematized view similar to that of FIG. 3.
Figure 9:
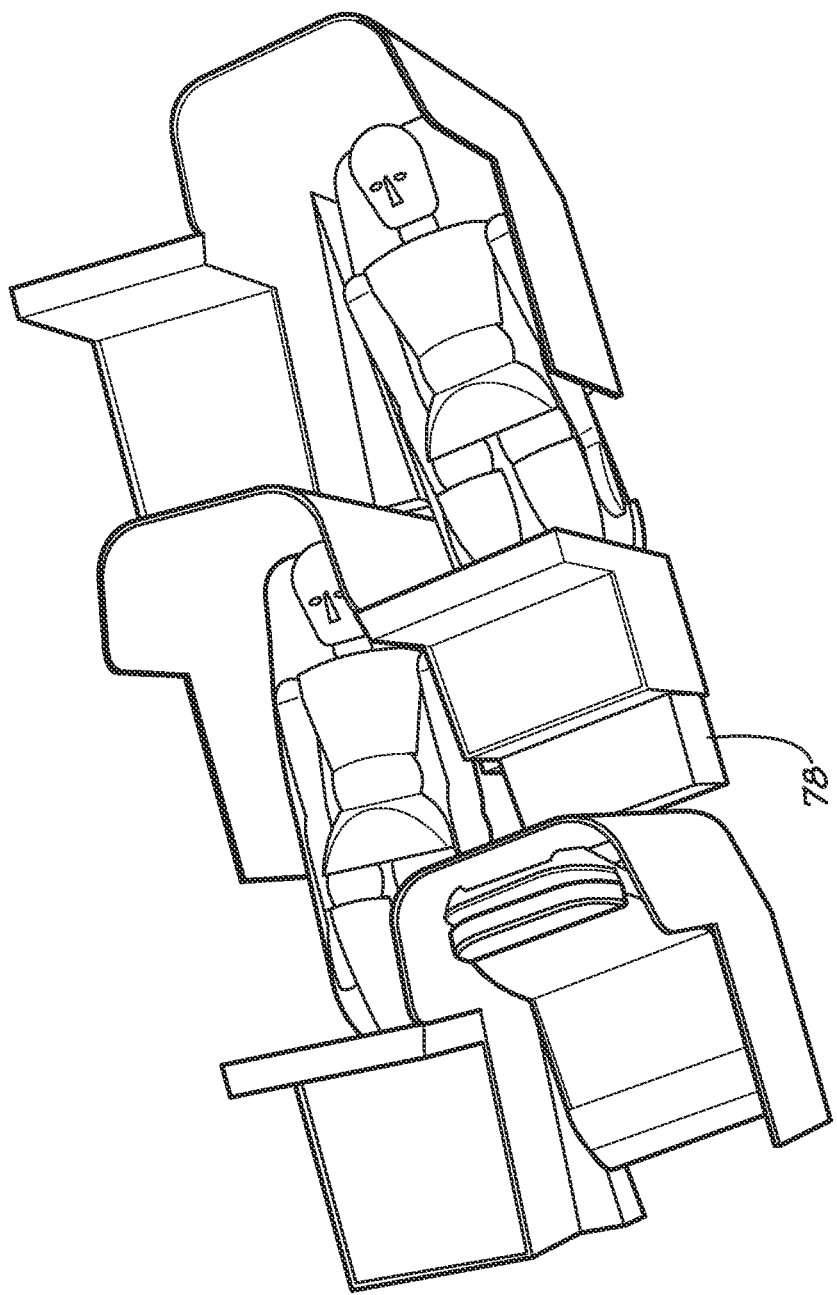
FIG. 9 is a perspective, partially-schematized view similar to those of FIGS. 4 and 7.

When extension 66 is extended, its upper surface 74 may function as a step. By so functioning, the occupant 18 of seat 14B, for example, may use the step to facilitate accessing aisle 26 even when the occupant 18 of seat 14C (for example) is resting or sleeping. Upper surface 74 and supporting walls 78 of extension 66 preferably are sufficiently rigid to support weight of an occupant 18 without material deformation, so that when an occupant 18 uses extension 66 as a step, feet accommodated by the extension 66 will not be disturbed. Alternatively, the occupant 18 of seat 14B may simply step over the extension 66, as shown in FIG. 8.

The present invention thus allows seats 14 to be placed more densely within a vessel while still allowing all occupants 18 to access aisle 26. This allows more efficient use of the limited space within the vessel, as it reduces overall seat/bed pitch without sacrificing passenger comfort. The foregoing hence is provided for purposes of illustrating, explaining, and describing embodiments of the present invention. Modifications and adaptations to these embodiments will be apparent to those skilled in the art and may be made without departing from the scope or spirit of the invention.

That which is claimed is:

1. A seating unit comprising:
   a. a seat; and
   b. a footwell assembly of variable length, in which the footwell assembly comprises an extension configured to move between an extended position and a retracted position so as to provide the variable length.

2. A seating unit according to claim 1 in which the footwell assembly further comprises a fixed-position portion.

3. A seating unit according to claim 2 in which the extension telescopes into and out of the fixed-position portion.

4. A seating unit according to claim 3 further comprising a shell.

5. A seating unit according to claim 4 in which the shell and the footwell assembly are connected.

6. A seating unit according to claim 5 in which, in use, the shell at least partially surrounds a second seat.

7. A seating unit according to claim 3 in which the extension has an upper surface configured to function as a step.

8. A seating unit according to claim 7 for use in an aircraft having a floor and in which, in use and extended, the extension protrudes into a gap otherwise present in the floor of the aircraft.

9. A seating unit according to claim 8 further comprising means for attachment to the floor of the aircraft.

10. A method of converting an aircraft seat into a bed comprising: a. causing a seat back of the aircraft seat to be predominantly horizontally oriented; b. causing a leg support of the aircraft seat to extend longitudinally; and c. causing a moveable portion of a footwell assembly to extend longitudinally.

11. A plurality of seating units configured to be arranged within a transport vessel, comprising:
   a. a first seat configured to be occupied by a first passenger;
   b. a first auxiliary unit laterally adjacent at least a portion of the first seat and comprising a first footwell assembly configured to receive feet of a third passenger;
   c. a second seat configured to be occupied by a second passenger; and
   d. a second auxiliary unit laterally adjacent at least a portion of the second seat and comprising a second footwell assembly (i) capable of extending longitudinally of variable length and (ii) configured to receive feet of the first passenger.

12. A plurality of seating units according to claim 11 further comprising:
   a. a third seat configured to be occupied by a third passenger; and
   b. a plurality of shields, each of which shields at least partially surrounding one of the first, second, or third seats.

13. A plurality of seating units according to claim 12 in which, at least when the second footwell assembly is of its minimum length, a longitudinal gap exists between the second footwell assembly and the shield at least partially surrounding the third seat so as to allow the second passenger to access an aisle of the vessel.

14. A plurality of seating units according to claim 12 in which, at least when the second footwell assembly is of its maximum length, at least a portion of the second footwell assembly functions as a step so as to allow the second passenger to access an aisle of the vessel.

15. A plurality of seating units according to claim 14 in which each of the first, second, and third seats has a longitudinal seat axis angled with respect to a longitudinal axis of the vessel.

16. A plurality of seating units according to claim 15 in which the first and third seats are angled identically with respect to the longitudinal axis of the vessel and the second seat is angled oppositely from the first and third seats with respect to the longitudinal axis of the vessel.

* * * * *